United States Patent
Spiegel

(10) Patent No.: US 9,375,669 B2
(45) Date of Patent: Jun. 28, 2016

(54) AIR FILTRATION APPARATUS

(71) Applicant: Bill Spiegel, Arcadia, FL (US)

(72) Inventor: Bill Spiegel, Arcadia, FL (US)

(*) Notice: Subject to any disclaimer, the term of this patent is extended or adjusted under 35 U.S.C. 154(b) by 452 days.

(21) Appl. No.: 13/922,138

(22) Filed: Jun. 19, 2013

(65) Prior Publication Data

US 2014/0373719 A1 Dec. 25, 2014

(51) Int. Cl.
- *B01D 46/42* (2006.01)
- *B01D 46/22* (2006.01)
- *B01D 46/00* (2006.01)

(52) U.S. Cl.
CPC ............ *B01D 46/22* (2013.01); *B01D 46/0038* (2013.01); *B01D 2201/50* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 1,982,639 | A * | 12/1934 | Christofferson | ....... | B01D 46/18 210/387 |
| 3,286,443 | A * | 11/1966 | Wooldridge | ........... | B01D 46/18 242/538.2 |
| 3,368,333 | A * | 2/1968 | Merklin | ................... | F24F 13/28 210/387 |
| 3,552,098 | A * | 1/1971 | Cochran | ................. | F24F 13/28 210/387 |
| 3,552,101 | A * | 1/1971 | Papp | ..................... | B01D 46/18 242/598.4 |
| 3,774,373 | A * | 11/1973 | Welch | .................... | B01D 46/18 242/586 |
| 4,174,205 | A * | 11/1979 | Koushiafes | ............ | B01D 46/18 55/354 |
| 4,221,576 | A * | 9/1980 | Phillips, Jr. | ............ | B01D 46/46 55/352 |
| 4,470,833 | A * | 9/1984 | Wolfe | ..................... | B01D 46/46 335/205 |
| 4,521,230 | A * | 6/1985 | Strong | ............... | B01D 46/0064 55/290 |
| 4,894,071 | A * | 1/1990 | Klein | ................. | B01D 46/0002 55/351 |
| 5,411,579 | A * | 5/1995 | Benton | ................. | B01D 46/18 55/290 |
| 5,529,593 | A * | 6/1996 | Simmons | ............... | B01D 46/18 55/354 |
| 5,599,363 | A * | 2/1997 | Percy | ..................... | B01D 46/20 55/352 |
| 6,152,998 | A * | 11/2000 | Taylor | .................... | B01D 46/18 55/354 |
| 6,168,646 | B1 * | 1/2001 | Craig | ................. | B01D 46/0086 55/354 |
| 6,402,822 | B1 * | 6/2002 | Najm | ................. | B01D 46/0086 55/351 |
| 6,491,735 | B2 * | 12/2002 | Najm | ................. | B01D 46/0086 55/351 |
| 6,596,059 | B1 * | 7/2003 | Greist | .................... | B01D 46/18 55/351 |
| 6,632,269 | B1 * | 10/2003 | Najm | ................. | B01D 46/0023 55/351 |
| 6,843,834 | B2 * | 1/2005 | Schumacher | ............ | B60H 3/06 55/351 |
| 8,313,567 | B2 * | 11/2012 | Sullivan | ................. | B01D 46/18 55/351 |
| 8,404,030 | B2 * | 3/2013 | Schumacher | ........ | B01D 46/185 55/351 |
| 8,591,616 | B2 * | 11/2013 | Sullivan | ............ | B01D 46/0054 55/351 |
| 8,617,278 | B2 * | 12/2013 | Sullivan | ................. | B01D 46/18 55/351 |
| 2009/0031684 | A1 * | 2/2009 | Ragona | ............... | B01D 46/185 55/383 |
| 2011/0061527 | A1 * | 3/2011 | Sullivan | ................. | B01D 46/18 95/1 |
| 2011/0061537 | A1 * | 3/2011 | Sullivan | ................. | B01D 46/18 95/273 |

* cited by examiner

*Primary Examiner* — Duane Smith
*Assistant Examiner* — Adam W Bergfelder
(74) *Attorney, Agent, or Firm* — Gulf Coast Intellectual Property Group

(57) ABSTRACT

An air filtration apparatus operable to be coupled with an air return of a conventional HVAC system wherein the air filtration apparatus is configured to supply a continuous supply of unused air filtration media. The air filtration apparatus further includes a frame having four sides and an opening configured to accommodate any size air return. A first media receptacle and a second media receptacle are mounted on the frame. Disposed within said first media receptacle and said second media receptacle is an air filtration media, wherein the air filtration media is substantially disposed within the first media receptacle in its first position and is disposed within the second media receptacle in its second position. A drive assembly and fan are operably coupled to the air filtration media operable to transition the air filtration media intermediate its first position and second position as a result of airflow through the air return.

7 Claims, 4 Drawing Sheets

AIR FILTRATION APPARATUS

PRIORITY UNDER 35 U.S.C SECTION 119(e) & 37 C.F.R. SECTION 1.78

This nonprovisional application claims priority based upon the following prior United States Provisional Patent Application entitled: Air Filtration Apparatus, Application No. 61/673,066, filed Jul. 18, 2012, in the name of Bill Spiegel, which is hereby incorporated by reference for all purposes.

FIELD OF THE INVENTION

The present invention relates to filtering systems, more specifically but not by way of limitation an air filtration apparatus for a heating and/or air conditioning system that provides a continuous clean air filter media surface during each active cycle and for an extended period of time.

BACKGROUND

A conventional air conditioning system is utilized in many commercial and residential structures to provide a consistent temperature as well as improve the quality of the air. The major parts of an air conditioning system include an evaporator, condenser, expansion valve, compressor and a blower. Many commercial and residential structures utilize what is commonly referred to as split-system units. These types of systems have a "cold" side and a "hot" side that are separated wherein the "hot" side is typically located externally to the structure. The "cold" side includes an expansion valve and an evaporator, which is generally disposed within an air handler. The air handler includes a blower, which moves the air through the evaporator coil and subsequently routes the air throughout the structure using a series of ducts. At least one air filter is located within the series of ducts and is responsible for performing several important functions.

A conventional air filter is operable to prevent dust and other particles from being deposited onto the evaporator coil as well as prevent the distribution of the dust/particles into the space being cooled or heated by the system. One problem with existing air conditioning systems is the required maintenance of replacing the air filter. Depending upon the environment and filter type, many air filters must be replaced on a routine basis. If an air filter is clogged and/or begins to allow particles therethrough, they can deposit onto the evaporator coil, which can substantially reduce the airflow passing through the evaporator coil. Dust and/or particles deposited on the fins of the evaporator coil can substantially inhibit proper performance of the evaporator coil. Additionally, untimely replacement of air filters can lead to dust and/or particles being introduced into the air of the space being conditioned by the air conditioning system, which can lead to respiratory health problems.

Studies have shown that most individual homeowners do not replace the air filters on a routine basis. The typical reasons for neglect are either that the air filter is not easily reached for replacement or the homeowner does not remember to replace the air filters as needed.

Accordingly, there is a need for an air filtration system that continuously provides a clean air filter media surface for the air stream within an air conditioning system during operation wherein the clean air filter media is provided in an automated manner and wherein the filter media is supplied without the need for replacement for an extended period of time.

SUMMARY OF THE INVENTION

It is the object of the present invention to provide an air filtration apparatus for an air conditioning, furnace system and/or heat pump system that provides a clean air filter media surface for the air traveling through the ducts of the system for each active cycle of the system.

Another object of the present invention is to provide an air filtration apparatus for an air conditioning system that provides a clean air filter media surface for each cycle of the system wherein the air filter media is provided in an automatic manner.

A further object of the present invention is to provide an air filtration system for an air conditioning system that provides a clean air filter media wherein the apparatus further includes a turbine or fan located on the downstream side of the air filtration apparatus.

Yet another object of the present invention is to provide an air filtration apparatus for an air conditioning system that provides a clean air filter media surface for each cycle that includes an air filter media configured to be traversed across the air stream during each active cycle of the air conditioning system.

Still another object of the present invention is to provide an air filtration apparatus for an air conditioning system that provides a clean air filter media surface for each cycle of the system wherein the turbine is operably coupled to the media so as to control the movement thereof across the air stream within the air conditioning system.

An additional object of the present invention is to provide an air filtration apparatus that provides a clean air filter media surface for each active cycle of an air conditioning system that further includes an alarm system to notify a user that the air filter media is substantially consumed.

To the accomplishment of the above and related objects the present invention may be embodied in the form illustrated in the accompanying drawings. Attention is called to the fact that the drawings are illustrative only. Variations are contemplated as being a part of the present invention.

BRIEF DESCRIPTION OF THE DRAWINGS

A more complete understanding of the present invention may be had by reference to the following Detailed Description when taken in conjunction with the accompanying Drawings wherein the drawings provide schematic views of a preferred embodiment of the present invention only and do not serve to limit the scope of the present invention wherein.

DETAILED DESCRIPTION

Figure 1:
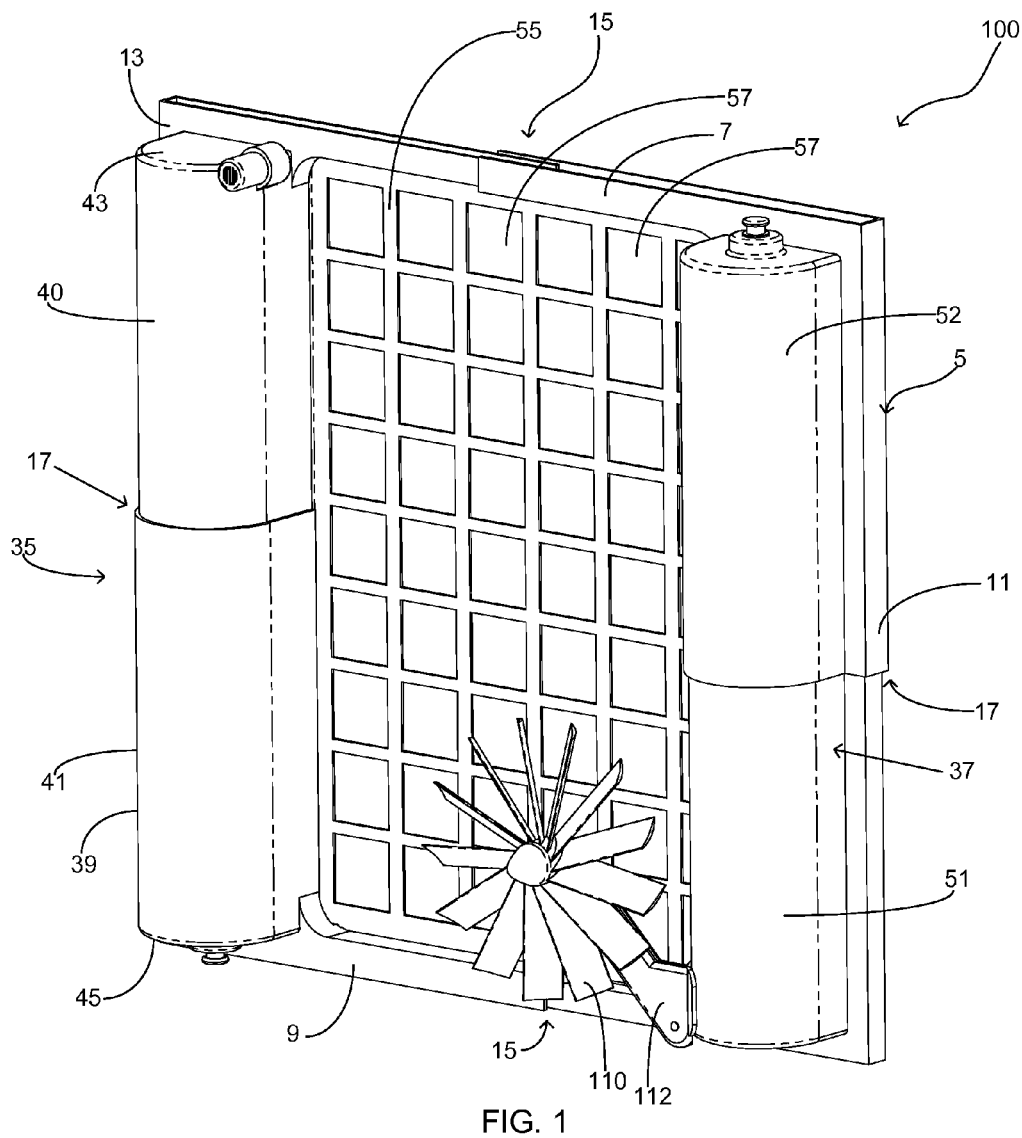
FIG. 1 is a rear perspective view of the preferred embodiment of the present invention.

Referring now to the drawings submitted herewith, wherein various elements depicted therein are not necessarily drawn to scale and wherein through the views and figures like elements are referenced with identical reference numerals, there is illustrated a air filtration apparatus 100 constructed according to the principles of the present invention.

Figure 2:
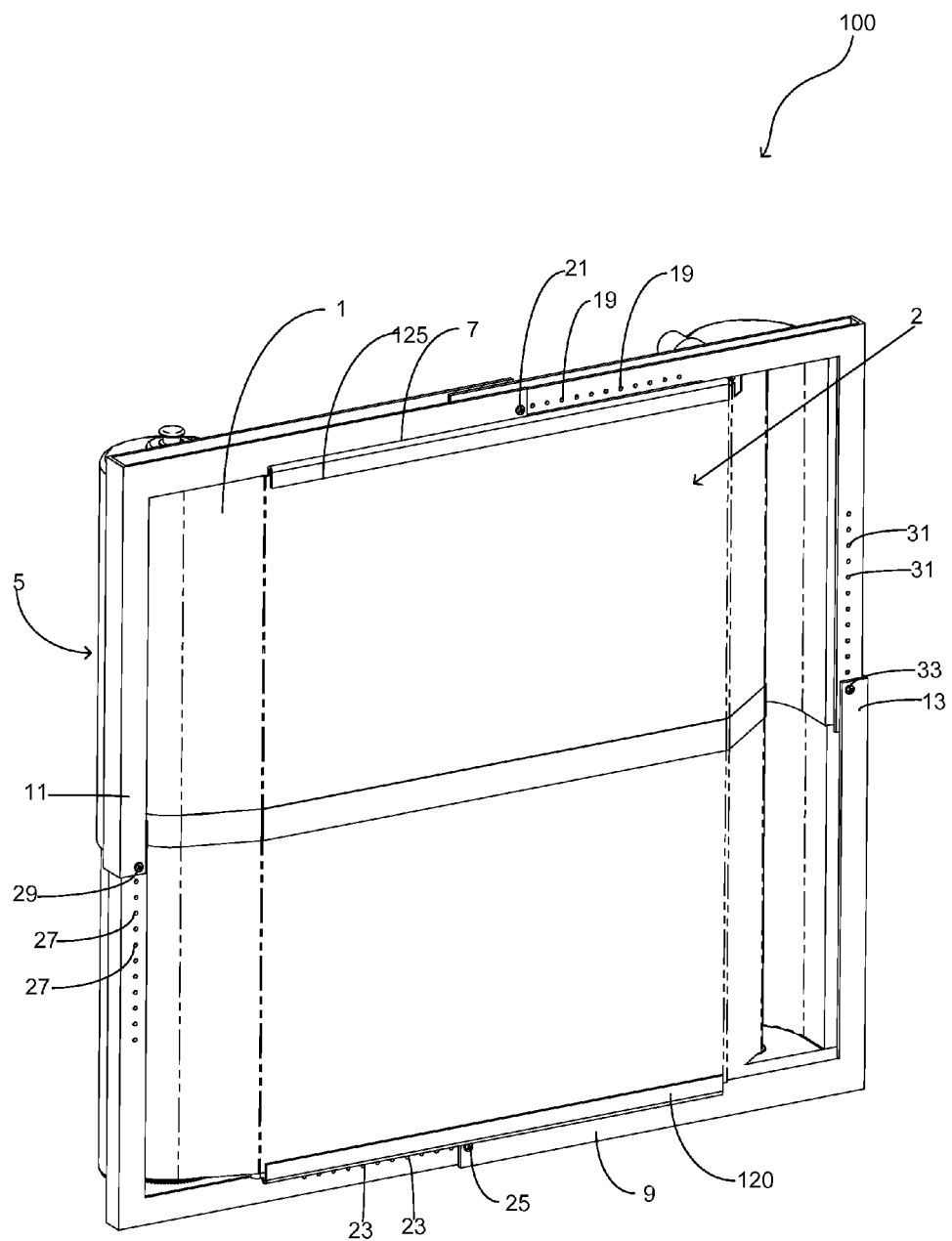
FIG. 2 is a front perspective view of the present invention.
Figure 4:
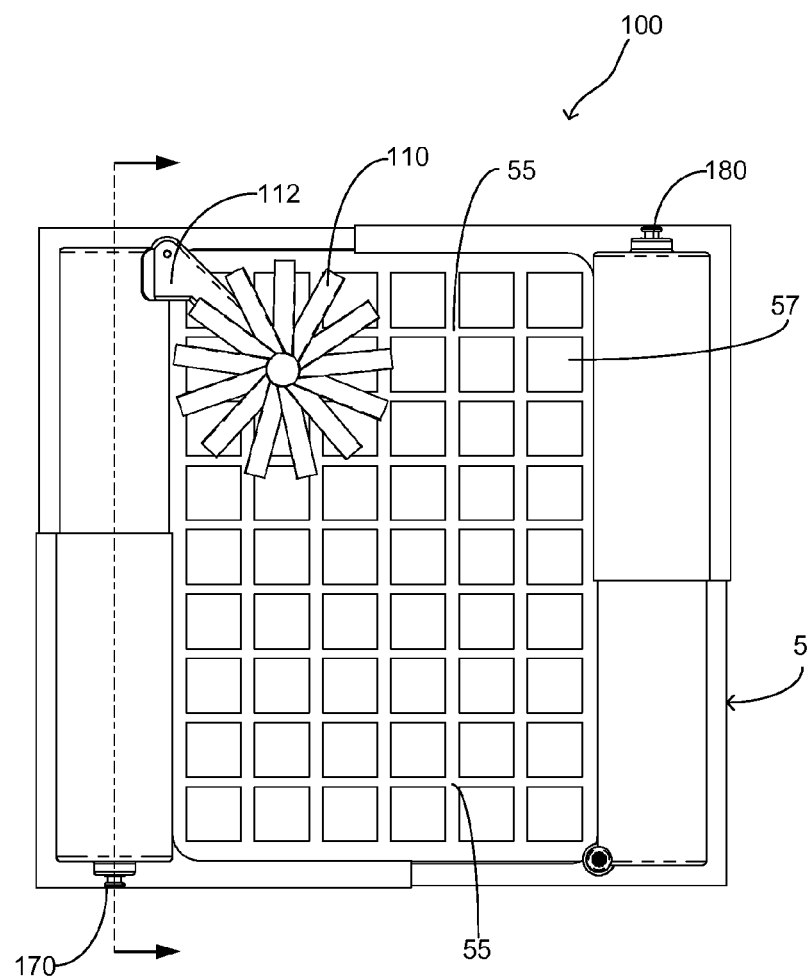
FIG. 4 is a rear view of the present invention.
Figure 3:
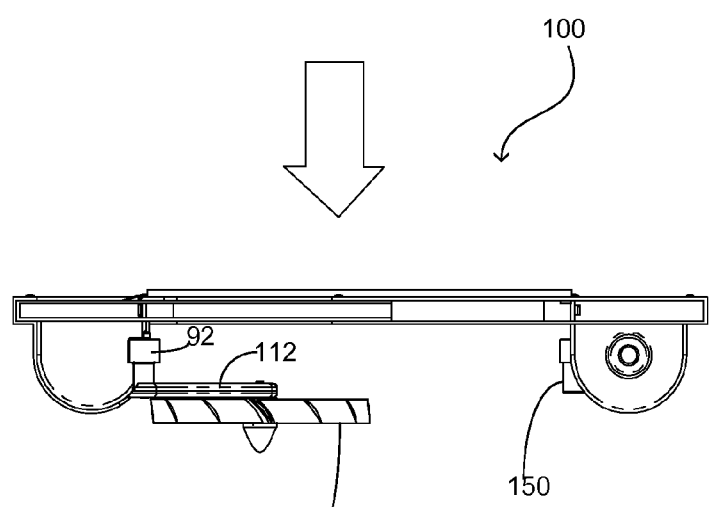
FIG. 3 is a bottom view of the present invention.

Referring in particular to FIG. 1, the air filtration apparatus 100 further includes a frame 5 that is generally square in shape and is operable to provide the structural support required for the air filtration apparatus 100. The frame 5 is manufactured from a suitable durable material such as but not limited to metal. The frame 5 includes an upper support member 7, lower support member 9, first longitudinal support member 11 and a second longitudinal support member 13 that are contiguously formed using suitable durable techniques to create the frame 5. The frame 5 is configured to be adjustable in a lateral and a longitudinal direction. The lateral adjustability is accomplished via construction of the upper support member 7 and lower support member 9 wherein each of the upper support member 7 and lower support member 9 further includes a slidably mounted portion 15. The slidable portion facilitates the lateral movement of the frame 5 in order to accommodate air returns of various widths. Additionally, the first longitudinal support member 11 and the second longitudinal support member 13 further includes a slidable operable connection proximate the midpoint 17. This slidable connection facilitates the frame 5 adjustment in a longitudinal direction. As shown in particular in FIG. 2 herein, the upper support member 7 further includes a plurality of apertures 19 operable to receive pin 21 while the lower support member 9 additionally includes a plurality of apertures 23 and pin 25. The apertures 19, 23 function to receive pins 21,25 respectively to secure the desired width subsequent the frame 5 being adjusted thereto. Additionally, the first longitudinal support member 11 includes a plurality of apertures 27 operable to receive pin 29 and the second longitudinal support member 13 further includes apertures 31 and pin 33. Similar to the upper support member 7 and lower support member 9, the apertures 27, 29 function to receive pins 29, 33 respectively in order to lock the frame 5 into a desired longitudinal length so as to accommodate an air return in which the user desires to secure the air filtration apparatus 100. While a preferred frame 5 has been disclosed herein, it is contemplated within the scope of the present invention that the frame 5 could be constructed in numerous other manners in order to achieve the desired functionality described herein.

Integrally formed with the frame 5 are the first media receptacle 35 and the second media receptacle 37. The first media receptacle 35 and second media receptacle 37 are operable to house the air filtration media 1 in a rolled form. The first media receptacle 35 includes a first housing 39 and a second housing 40 that are slidably coupled so as to allow for the longitudinal adjustment of the frame 5 as previously discussed herein. The housing 40 includes a wall 41, top 43 and bottom 45 integrally formed to create an interior volume suitable for retaining therein the air filtration media 1 in a rolled format. While the air filtration media 1 is provided in a rolled format in the disclosed embodiment, it is contemplated within the scope of the present invention that the air filtration media could be stored in various configurations. More specifically but not by way of limitation, the air filtration media 1 could be stored in a z-fold or other similar configuration. The wall 41 is generally semicircular in shape so as to prevent binding of the air filtration media 1 as the air filtration media 1 is dispensed from the first media receptacle 35. While the first media receptacle 35 has been illustrated herein as having a semicircular wall 41, it is contemplated within the scope of the present invention that the first media receptacle 35 could be formed in numerous different shapes. A second media receptacle 37 is integrally formed with the frame 5 opposite the first media receptacle 35. The second media receptacle 37 is similarly constructed as the first media receptacle 35 wherein the second media receptacle 37 includes a first housing 51 and a second housing 52 that are slidably coupled so as to accommodate the longitudinal adjustment of the frame 5 as described herein. The second media receptacle 37 is operable to receive the air filtration media 1, as the air filtration media 1 is retrieved thereinto.

Secured to the frame 5 opposite the first media receptacle 35 and second media receptacle 37 is a media support grid 55. The media support grid 55 is manufactured from a suitable durable material such as but not limited to metal. The media support grid 55 functions to provide support for the air filtration media 1 as it is suspended across the opening 2 of the frame 5. The media support grid 55 includes a plurality of spaces 57 that are operable to allow the passage of air through the media support grid 55. While not particularly illustrated herein, it is contemplated within the scope of the present invention that the media support grid 55 could be manufactured to accommodate adjustability in both an x-axis and a y-axis direction so as to configure in size to the opening 2 of the frame 5. Additionally, it is contemplated within the scope of the present invention that the media support grid 55 could be alternatively constructed in order to provide support for the air filtration media 1, as the air filtration media 1 is dispensed thereacross. More specifically but not by way of limitation, a plurality of length adjustable support bars or similar structure could be mounted intermediate the first longitudinal support member 11 and the second longitudinal support member 13 so as to provide support for the air filtration media 1 suspended across the opening 2.

Figure 5:
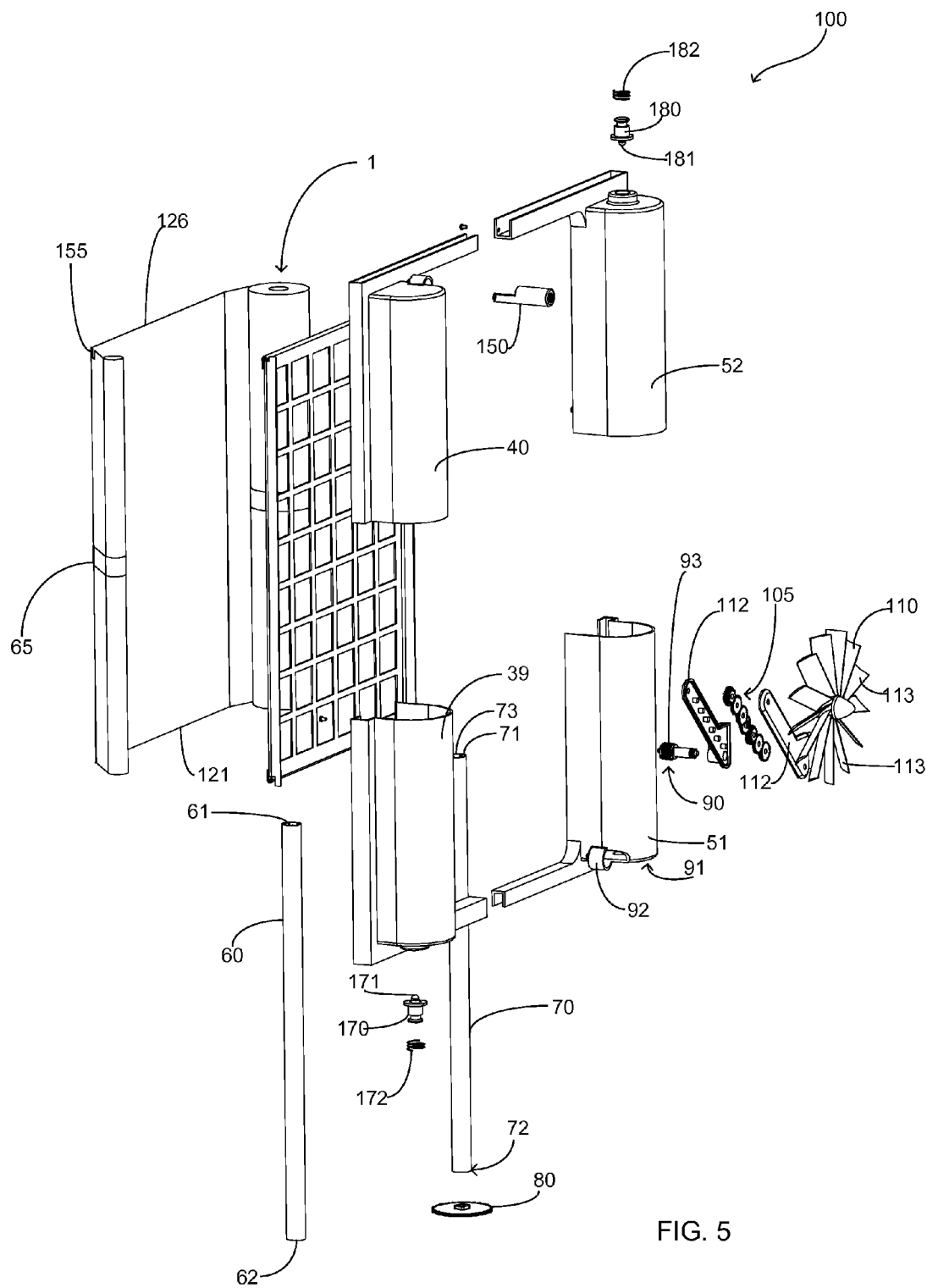
FIG. 5 is an exploded diagrammatic view of the present invention.

As shown in FIG. 5, the air filtration media 1 is stored on support tube 60. The support tube 60 is a conventional tube manufactured from a suitable durable material such as but not limited to cardboard. The support tube 60 includes a first opening 61 and a second opening 62 configured to assist in the releasable securing of the support tube in the first media receptacle 35. The air filtration media 1 is made of a suitable material such as but not limited to glass fibers or HEPA material and is operable to substantially remove airborne particles from the air passing through the air filtration apparatus 100. The air filtration media 1 further includes a fragrance strip 65. The fragrance strip 65 extends the length of the roll of air filtration media 1 and is operable to release a fragrance into the air conditioning system to which the air filtration apparatus 100 is operably coupled. It is contemplated within the scope of the present invention that the fragrance strip 65 could have more than one fragrance compound impregnated thereinto so as to dispense different odors during the retrieval of the air filtration media 1. While a fragrance strip 65 has been disclosed herein, it is contemplated within the scope of the present invention that the air filtration media 1 could be manufactured without a fragrance strip 65. Additionally, it is contemplated within the scope of the present invention that the fragrance strip 65 could be manufactured in numerous different sizes and/or shapes so as to control the level of fragrance release.

The air filtration media 1 is moved across the opening 2 of the frame 5 and circumferentially mounted to the second support tube 70. As the air filtration media 1 is transitioned across the opening 2 it is supported by the media support grid 55. Additionally, the air filtration media 1 is operably engaged with upper track support 125 and the lower track support 120. The upper track support 125 and lower track support 120 are operable to provide support of the upper edge 126 and lower edge 121 respectively of the air filtration media 1 as it moves across the opening 2. The upper track support 125 and lower track support further substantially inhibit any movement of the air filtration media 1 that may result in misalignment thus causing the binding thereof during the retrieval process. The upper track support 125 and lower track support 120 are manufactured from a suitable durable material such as but not limited to plastic or metal.

The second support tube 70 is constructed of a suitable durable material such as but not limited to plastic and is rotated by the gear 80. The air filtration media 1 is supplied with the support tube 60 and is wrapped therearound in a desired length. The second support tube 70 is either supplied with the air filtration media 1 or configured to have an end of the air filtration media 1 secured thereto so as to operably secured the air filtration media 1 to the second support tube 70. The second support tube 70 includes a first end 71 and a second end 72 wherein the first end 71 includes an opening 73. The second support tube 70 is substantially hollow intermediate first end 71 and second end 72. It is contemplated within the scope of the present invention that the second support tube 70 could be used to store batteries or a power source to be utilized by the air filtration apparatus 100. Proximate the second end 72 of support tube 70 is a gear 80. The gear 80 is operably to rotate the second support tube 70 (as further described herein) so as transition the air filtration media 1 from being stored on the support tube 60 to being stored on the second support tube 70. The transition of the air filtration media 1 to the second support tube 70 is operable to occur at a slow rate so as to provide a user of the air filtration apparatus 100 with a air filter media 1 that is usable for an extended period of time and further provides a clean air filtration media 1 to the airflow passing through the opening 2.

The gear 80 is secured to the second end 72 of the second support tube 80 and controls the rotation of the second support tube 70. The gear 80 is operably coupled to drive gear 90. Drive gear 90 and gear 80 are manufactured with conventional meshing pinion teeth facilitating the operable coupling. Drive gear 90 is mounted to the second media receptacle 37 proximate the bottom 91 via bracket 92. The drive gear 90 includes a first portion 93 that is operably coupled to the gear 80 and a second portion 94 configured to be operably coupled to the drive assembly 105. The drive assembly 105 is disposed within the drive assembly housing 112 and is operably coupled via suitable durable techniques to the drive fan 110. The drive fan 110 is a conventional style fan having a plurality of blades 113 operable to engage the airflow passing through the opening 2 and cause the rotation of the drive fan 110. The drive fan 110 is rotatably mounted on the drive assembly housing 112 using suitable durable techniques such that the drive fan 110 is suspended over the opening 2 of the frame 5. This mounting position allows the airflow passing through the opening 2 of the air filtration apparatus 100 to rotate the drive fan 110. As the drive fan 110 is rotated, the drive assembly 105 moves the drive gear 90, which subsequently rotates the gear 80 facilitating the retrieval of the air filtration media 1 from support tube 60 to the second support tube 70. The advantage of this configuration allows the air filtration media 1 to be consumed only during periods of airflow through the air return to which the air filtration apparatus 100 is mounted. This reduces waste of the air filtration media 1 and ensures that the air filtration media 1 is appropriately saturated prior to transferring to the second support tube 70. The drive assembly 105 is manufactured from suitable components such as but not limited to collective group of sprockets or a chain that are configured to provide a rotational gear reduction. It is contemplated within the scope of the present invention that a gear reduction exists between the drive fan 110 and the gear 80 so as to control the retrieval of the air filtration media 1 at a desired pace. While no particular gear reduction is required good results have been achieved utilizing a gear reduction of 200,000 to 1. A large gear reduction such as the aforementioned example is desirable so as to facilitate the retrieval of the air filtration media 1 at a pace that allows the air filtration media 1 portion exposed across the media support grid 55 to be present so as to effectively be saturated with airborne particles as the air filtration media 1 is passed across the media support grid 55. It is further contemplated within the scope of the present invention that the drive fan 110 could be manufactured in numerous different sizes and be placed in various positions wherein at least a portion thereof is engaged with the airflow passing through opening 2. While a drive fan 110 has been disclosed herein in the preferred embodiment as a technique to operate the drive assembly 105 so as to rotate the second support tube 70, it is contemplated within the scope of the present invention that the second support tube 70 could be rotated utilizing other suitable mechanical elements. More specifically but not by way of limitation, the second support tube 70 could be rotated utilizing an electric motor or similar device. The movement of the air filtration media 1 is designed to move only when air is passing through the air return to which the air filtration apparatus 100 is secured.

An alarm 150 is mounted proximate the first media receptacle 35 and is operable to provide audible notification that the air filtration media 1 has been substantially dispensed from the support tube 60. The alarm 150 includes conventional electronics operable to receive, store, transmit and manipulate data and is powered by a power source such as but no limited to a battery. In the preferred embodiment, the alarm 150 is a photo sensor alarm that utilizes a light beam to monitor the upper edge 126 of the air filtration media 1 for notch 155. As notch 155 becomes substantially aligned with alarm 150 the light beam of the alarm is reflected back into the alarm 150 and subsequently an audible alarm is produced. The notch 155 is constructed so as to allow the light beam of the sensor to pass therethrough. The alarm 150 functions to notify a user that the air filtration media 1 will soon be completely dispensed from the support tube 60. While the alarm in the preferred embodiment utilizes a photo sensor, it is contemplated within the scope of the present invention that the alarm 150 could utilize various types of trigger mechanisms to provide the desired functionality. More specifically but not by way of limitation, the alarm 150 could utilize mechanical components such as but not limited to a micro-switch to provide monitoring of the air filtration media 1.

The support tube 60 and the second support tube 70 are releasably secured within the first media receptacle 35 and second media receptacle 50 respectively. The releasable securing of the support tube 60 and second support tube 70 facilitates the removal and replacement of the air filtration media 1. As shown in particular in FIG. 5, release pin 170 is operably coupled to the first media receptacle 35 having knob 171 projecting into the first media receptacle 35 so as to engage support rod 60. Release pin 170 includes spring 172 that maintain the release pin in a biased position inwards toward the support tube 60 so as to releasably secure the support tube 60. The release pin 170 is grasped by a user and moved in a direction away from the support tube 60 so as to remove the support tube 60 from the first media receptacle 35. Similarly, the second support tube 70 is releasably secured within the second media receptacle 50 using release pin 180, spring 182 and knob 181. While the aforementioned elements for releasably securing the support tube 60 and second support tube 70 have been disclosed herein in the preferred embodiment, it is contemplated within the scope of the present invention that the second support tube 70 and support tube 60 could be releasably secured utilizing numerous different styles of fasteners and/or mechanisms.

While not particularly illustrated herein, it is contemplated within the scope of the present invention that the air filtration apparatus 100 further include a central processing unit. The central processing unit would be a conventional CPU that includes the necessary electronic components to store, receive, manipulate and transmit data. It is intended within the scope of the present invention that the central processing unit would be utilized to track, record and provide notification to a user of usage metrics such as but not limited to cubic air volume, hours used and remaining percentage of air filter. Those skilled in the art will recognize that numerous types of metrics could be captured and transmitted to a user.

While a movement pattern of the air filtration media 1 has been disclosed herein such that in the preferred embodiment the air filtration media 1 is transferred across the opening 2 at a slow rate to the second media receptacle 37, it is contemplated within the scope of the present invention that the air filtration media 1 could be moved across the opening 2 using numerous techniques. More specifically but not by way of limitation, the air filtration media 1 could be moved across the opening 2 in larger sections effectively wherein a section of air filtration media 1 is present across the opening 2 for an extended period of time allowing the air filtration media 1 to become saturated. Ensuing saturation or at a desired interval the air filtration media 1 is then replaced by transferring the air filtration media 1 in larger increments to the second media receptacle 37. Additionally, while the drive fan 110 is operable to transition the air filtration media 1, it is further contemplated within the scope of the present invention that the drive fan 110 could be used to provide power to an electric motor that would be operably coupled to the air filtration media 1 to provide operation thereof. Furthermore, it is additionally contemplated within the scope of the present invention that the drive fan 110 could be operably coupled to a rechargeable power source operably coupled to an electric motor responsible for operation of the air filtration media 1 as described herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An air filtration apparatus operable to be coupled with an air return of an air conditioning or heating system comprising:
   a frame, said frame being adaptable to be releasably secured within the air return, said frame having an upper member and a lower member, said frame having a first lateral member and a second lateral member, said upper member, said lower member, said first lateral member and said second lateral member being contiguously formed, said frame being adjustable in a lateral and a longitudinal direction so as to accommodate any size air return, said frame having an opening;
   a first media receptacle, said first media receptacle being integrally formed with said frame, said first media receptacle being formed so as to have an interior volume;
   a second media receptacle, said second media receptacle being integrally formed with said frame opposite said first media receptacle, said second media receptacle having an interior volume;
   an air filtration media, said air filtration media having an upper edge and a lower edge, said air filtration media having a first end and a second end, said upper edge of said air filtration media having a notch formed in said upper edge proximate said second end, said air filtration media being releasably stored in said first media receptacle, said air filtration media extending across said opening of said frame and into said second media receptacle, said air filtration media operable to be transitioned from said first media receptacle to said second media receptacle;
   a media moving member, said media moving member operably coupled to said air filtration media, said media moving member operable to move said air filtration media from said first media receptacle to said second media receptacle; and
   an alarm, said alarm operable to monitor said upper edge of said air filtration media, said alarm configured to provide an alert to a user ensuing detection of said notch.

2. The air filtration apparatus as recited in claim 1, wherein said media moving member is a drive fan, said drive fan being mounted at least partially over said opening of said frame, said drive fan being operably coupled to said air filtration media so as to transition said air filtration media from said first media receptacle to said second media receptacle.

3. The air filtration apparatus as recited in claim 2, and further including a drive assembly, said drive assembly operably coupling said drive fan to said air filtration media, said drive assembly further providing gear reduction between said drive fan and said air filtration media.

4. The air filtration apparatus as recited in claim 3, and further including a media support grid, said media support grid substantially extending across said opening of said frame, said media support grid operable to provide support for said air filtration media as it is extends across said opening during transition to said second media receptacle.

5. The air filtration apparatus as recited in claim 4, and further including a first support tube and a second support tube, said air filtration media being disposed around said first support tube in said first position, said air filtration media being disposed around said second support tube in said second position.

6. The air filtration apparatus as recited in claim 5, wherein said air filtration media further includes a fragrance compound, said fragrance compound being impregnated into a portion of said air filtration media.

7. The air filtration apparatus as recited in claim 1, wherein said alarm is a photo sensor configured to monitor the upper edge of the air filtration media.

\* \* \* \* \*